US012734958B2

(12) United States Patent
Enzweiler

(10) Patent No.: US 12,734,958 B2
(45) Date of Patent: Sep. 15, 2026

(54) DIFFUSER FOR A VEHICLE, AND VEHICLE COMPRISING SUCH A DIFFUSER

(71) Applicant: MERCEDES-BENZ GROUP AG, Stuttgart (DE)

(72) Inventor: Etienne Enzweiler, Böblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/160,977

(22) PCT Filed: Jan. 24, 2024

(86) PCT No.: PCT/EP2024/051648

§ 371 (c)(1), (2) Date: Aug. 29, 2025

(87) PCT Pub. No.: WO2024/179754

PCT Pub. Date: Sep. 6, 2024

(65) Prior Publication Data

US 2026/0241856 A1 Aug. 20, 2026

(30) Foreign Application Priority Data

Mar. 2, 2023 (DE) ..................... 10 2023 000 773.0

(51) Int. Cl.

*B60Q 1/26* (2006.01)
*B62D 35/00* (2006.01)
(Continued)

(52) U.S. Cl.

CPC ......... *B60Q 1/2692* (2013.01); *B60Q 1/2661* (2013.01); *B62D 35/007* (2013.01); *B62D 35/02* (2013.01); *B62D 37/02* (2013.01)

(58) Field of Classification Search

CPC .... B60Q 1/2661; B60Q 1/2692; B60Q 1/302; B62D 35/02; B62D 37/02

See application file for complete search history.

(56) References Cited

U.S. PATENT DOCUMENTS 5,119,068 A * 6/1992 Nagai .................. B62D 35/007 362/523
5,923,245 A 7/1999 Klatt et al.
(Continued)

FOREIGN PATENT DOCUMENTS

DE 19652692 C1 6/1998
DE 102004022179 A1 3/2005
(Continued)

OTHER PUBLICATIONS

International Search Report and Written Opinion mailed Apr. 24, 2024 in related/corresponding International Application No. PCT/EP2024/051648.

(Continued)

*Primary Examiner* — William N Harris
(74) *Attorney, Agent, or Firm* — PATENT PORTFOLIO BUILDERS PLLC

(57) ABSTRACT

A vehicle diffuser includes a diffuser carrier, at least one air-guiding element moveable relative to the diffuser carrier, and an actuator, connected to the diffuser carrier and the air-guiding element, for changing a position of the air-guiding element. The air-guiding element is a flap pivotably connected to the diffuser carrier at an end edge. The actuator pivots the air-guiding element from a retracted position, in which the main body of the flap is embedded in an opening in the diffuser carrier corresponding to the cross-section of the flap, into at least one extended position by actuation. A lighting apparatus is attached to the air-guiding element. The lighting device emits light when the air-guiding element is or has been pivoted from the retracted position into the at least one extended position.

8 Claims, 3 Drawing Sheets

Figure 1:
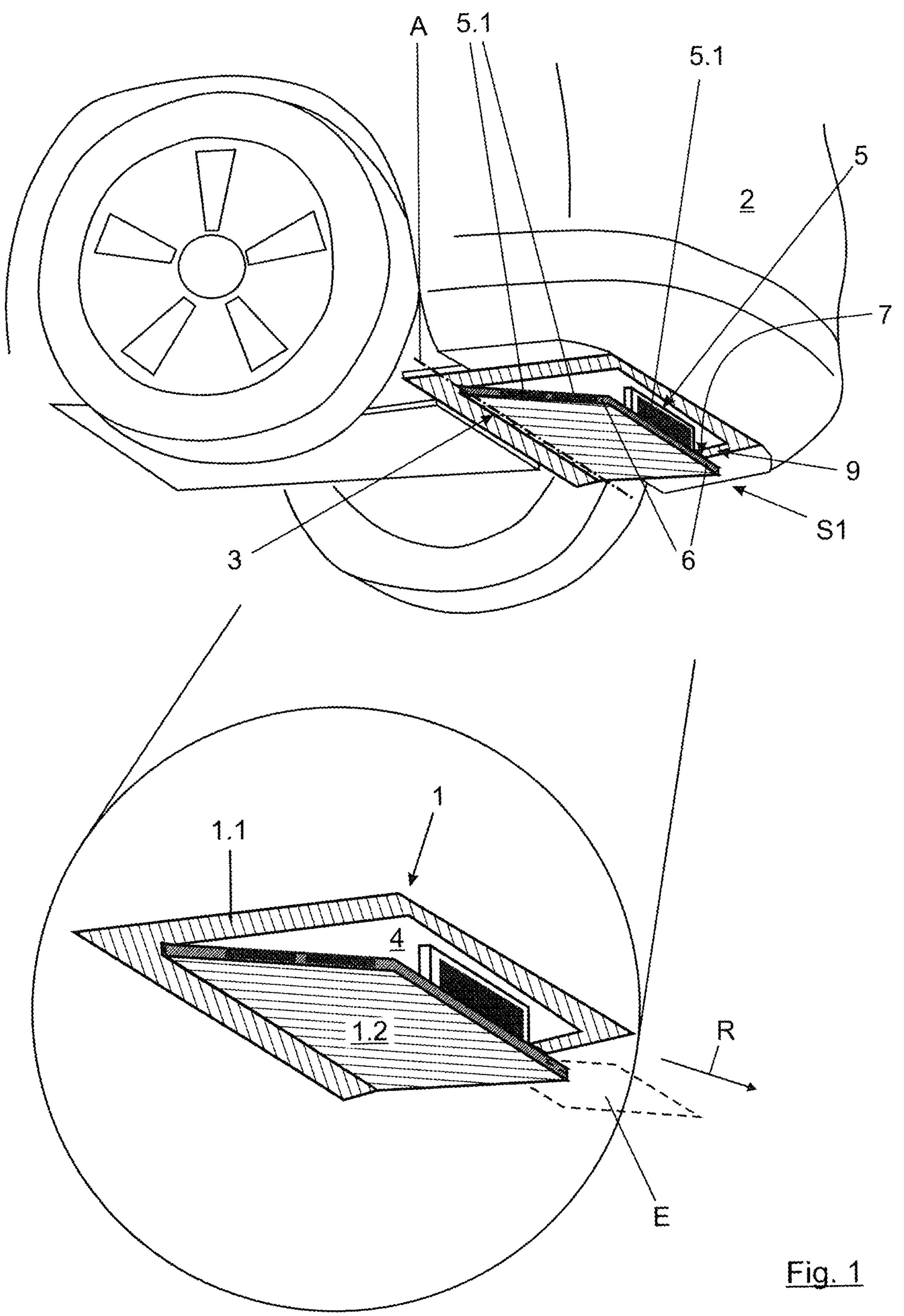

(51) Int. Cl.

| | |
|---|---|
| ***B62D 35/02*** | (2006.01) |
| ***B62D 37/02*** | (2006.01) |

(56) References Cited

U.S. PATENT DOCUMENTS

| | | | | |
|---|---|---|---|---|
| 7,686,384 | B2 | 3/2010 | Paul et al. | |
| 8,926,000 | B2 | 1/2015 | del Gaizo et al. | |
| 10,207,632 | B2 * | 2/2019 | Benboujema | B60Q 1/2619 |
| 2018/0215423 | A1 * | 8/2018 | Hermann | B62D 35/007 |
| 2019/0009841 | A1 | 1/2019 | Wolf et al. | |
| 2019/0077298 | A1 * | 3/2019 | Dill | B60Q 1/0011 |
| 2019/0329698 | A1 * | 10/2019 | Leonard | B60Q 1/0483 |
| 2021/0339808 | A1 | 11/2021 | Iorga et al. | |
| 2022/0402564 | A1 | 12/2022 | Rose et al. | |

FOREIGN PATENT DOCUMENTS

| | | | |
|---|---|---|---|
| DE | 102012102668 | A1 | 10/2013 |
| DE | 202017101000 | U1 | 4/2017 |
| EP | 2011723 | A2 | 1/2009 |
| EP | 3741620 | A1 | 11/2020 |
| FR | 3073809 | A1 | 5/2019 |
| JP | H02120195 | A | 5/1990 |

OTHER PUBLICATIONS

Office Action created Jul. 28, 2023 in related/corresponding DE Application No. 10 2023 000 773.0.

* cited by examiner

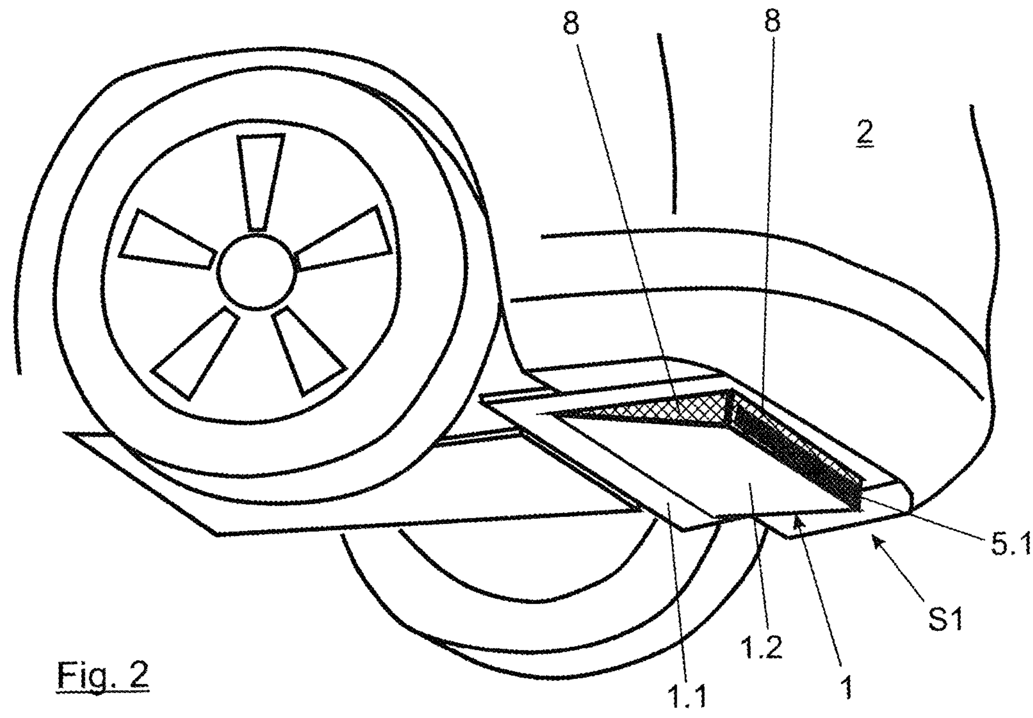
Fig. 2
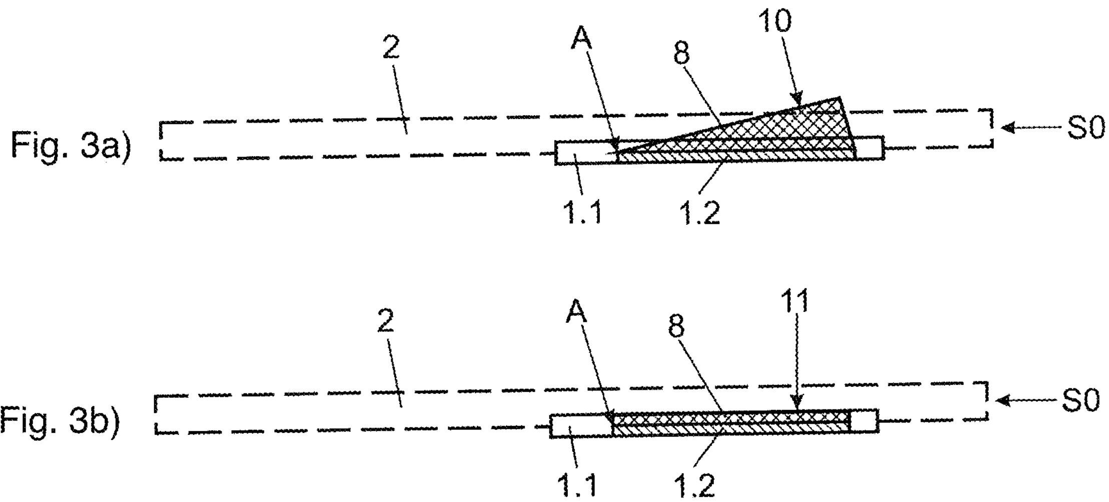

DIFFUSER FOR A VEHICLE, AND VEHICLE COMPRISING SUCH A DIFFUSER

BACKGROUND AND SUMMARY OF THE INVENTION

Exemplary embodiments of the invention relate to a diffuser for a vehicle, as well as to a vehicle comprising such a diffuser.

Lighting devices are integrated in vehicles to improve the visibility of the vehicles in poor visibility conditions such as in fog or in the dark. In addition, lighting devices enable the driver to better detect their surroundings. Legal provisions prescribe that, depending on the type of vehicle, different lighting devices such as direction indicators, brake lights, headlights, daytime running lights and the like are required.

Diffusers are known for use with vehicles. These are air-guiding elements with which the air stream around the vehicle is targetedly directed during travel in order to reduce the vehicle uplift, increase the downforce on the vehicle and/or reduce aerodynamic drag.

For instance, DE 20 2017 101 000 U1 discloses a diffuser mounted on a vehicle underbody in the rear and having two air ducts, at the end of which a heat exchanger is integrated. The heat exchanger serves to cool the coolant of a rear axle differential.

Also known are active diffusers. The geometry of an active diffuser can be altered during travel to targetedly adapt the air flow properties to the speed of travel. Such a diffuser is known, for example, from DE 10 2004 022 179 A1. The diffuser comprises a rigid part attached to the vehicle underbody in the rear region and a moveable part connected thereto. The moveable part is formed by a thin panel and can be moved translationally.

Furthermore, DE 10 2012 102 668 A1 discloses a front diffuser for a motor vehicle. The front diffuser is integrated in the underbody of the motor vehicle in the area of the vehicle front and has a flap pivotable between a first end position and a second end position within an air duct. In the retracted end position, the flap lies obliquely towards the vehicle rear, rising towards the rear in the air duct, and in the extended end position, the flap extends horizontally in the air duct.

Furthermore, DE 196 52 692 C1 discloses a motor vehicle with two brake lights. An upwardly extendable air-guiding apparatus is provided on the rear of the vehicle, which, in the extended position, conceals a first one of the brake lights from view. A second of the brake lights is integrated in the air-guiding apparatus on a side facing the rear, so that at least one brake light is visible for further road users, irrespective of the position of the air-guiding apparatus.

Furthermore, JP H02-120 195 A discloses a rear spoiler for a vehicle with a brake light integrated in the rear spoiler. The brake light is hidden behind an upwardly pivotable flap. If the vehicle brakes, the flap folds upwards and exposes the brake light. As a result, the light emitted by the brake light is made visible. Pivoting the flap upwards increases the aerodynamic drag of the vehicle, which has an additional braking effect.

Exemplary embodiments of the present invention are directed to a diffuser for vehicles that is improved in relation to the prior art.

In a generic diffuser for a vehicle, comprising a diffuser carrier, at least one air-guiding element that can be moved relative to the diffuser carrier, and an actuating means, connected to the diffuser carrier and the air-guiding element, for changing a position of the air-guiding element, provision is made that

- the air-guiding element is formed by a flap that is pivotably connected to the diffuser carrier at an end edge;
- the actuating means is designed to pivot the air-guiding element from a retracted position, in which the main body of the flap is embedded in an opening in the diffuser carrier corresponding to the cross-section of the flap, into at least one extended position by actuation; wherein the diffuser according to the invention is refined in that
- a lighting apparatus, comprising at least one lighting device, is attached to the air-guiding element; wherein
- the lighting device is designed to emit light when the air-guiding element is or has been pivoted from the retracted position into the at least one extended position; furthermore having:
- sealing means connected at least to the flap, wherein the sealing means in the extended position of the air-guiding element fill the gap formed when the flap is pivoted relative to the diffuser carrier, and wherein at least parts of the sealing means are formed by a rigid body and/or by an elastic material; and wherein
- at least one section of the sealing means is transparent and at least one lighting device is arranged behind the transparent section as viewed from outside the space sealed by the sealing means;
- at least one lighting device is embedded in the sealing means; and/or
- at least one lighting device forms the sealing means partially or completely.

The diffuser according to the invention is therefore a functionally integrated diffuser. Not only does it have the task of targetedly directing air and thus lowering the aerodynamic drag of the vehicle, but it also serves as a lighting apparatus for the vehicle. This makes it possible to provide completely novel light emission characteristics for the vehicle. For instance, it is possible to provide appropriate lighting devices at locations on the vehicle at which, to date, it has not been possible to provide any lighting devices. This makes the vehicle more visible in poor lighting conditions and also better illuminates the surroundings of the vehicle, so that a vehicle user can likewise better see their surroundings. Therefore, the diffuser according to the invention improves general road safety and increases user convenience.

The diffuser according to the invention also has a particularly simple design. For instance, the air-guiding element is merely a simple, pivotable flap. The flap can have a substantially flat design or also have protruding guide structures for air flowing past the vehicle. The flap can also be undulated, structured, curved or the like, at least in sections. Thus, the air-guiding element can be manufactured simply and cost-effectively.

Any conceivable actuator can be used as actuating means. For example, an electric motor, pneumatic or hydraulic cylinder, a piezo actuator, or the like can serve as actuator. The respective actuator can be combined with a gear mechanism, such as gears, levers, pulley mechanisms, guide links and the like.

Because the main body of the flap has the same cross-sectional shape and cross-sectional area as the corresponding opening in the diffuser carrier, the flow properties of the vehicle are improved when the air-guiding element is retracted. Therefore there are no significant openings or gaps that could result in turbulence and thus flow losses.

Depending on the type of vehicle, in particular in all-terrain vehicles, a reduction in the aerodynamic drag can also be achieved when the diffuser is extended. In all-terrain vehicles, the area behind the rear wheel as a rule rises relative to the driving surface (angle of driving slope). An active diffuser that folds down accordingly reduces the angle of the vehicle bottom in relation to the driving surface and can therefore, in the extended state, reduce the aerodynamic drag by partially extending the flat underbody between the axles beyond the rear axle.

The lighting apparatus can have one or multiple lighting devices. A respective lighting device is formed in this case by a contiguous structure that can emit light. A lighting device can have one or multiple lights, for example LEDs, incandescent bulbs, lasers, or the like. A lighting device can also be formed by a display device, such as a display. All conceivable display technologies can be used for this purpose, such as LEDs, LCDs, mini LEDs, OLEDs, quantum dots, and the like. An appropriate display can have a rigid, foldable, or also elastic and thus rollable design. A projector can also act as lighting device.

A respective lighting device can have all customary optical components, such as reflectors, lenses, diffusing discs, microlenses, color filters, polarizing filters, and the like.

Light emitted by a lighting device can be monochromatic or also multi-colored. This allows dynamic light patterns to be generated, for example by targeted control of different lights. A light beam can also be targetedly directed towards the surroundings, for example by means of actuators or matrix headlights. Animated light patterns, such as moving light fields, can also be presented via a display. While light is being emitted, the light properties can be changed, such as brightness, color, flashing frequency and the like.

The diffuser comprises sealing means connected at least to the flap, wherein the sealing means in the extended position of the air-guiding element fill the gap formed when the flap is pivoted relative to the diffuser carrier, and wherein at least parts of the sealing means are formed by a rigid body and/or by an elastic material. The sealing means can also additionally be connected to the diffuser carrier. The sealing means enable the flow properties of the diffuser to be improved. Were the gap between flap and diffuser carrier not to be closed when the flap is extended or pivoted, vortices that increase the aerodynamic drag would occur here. Providing the sealing means prevents air from flowing around the flap towards the opening in the diffuser carrier, thereby correspondingly counteracting an increase in aerodynamic drag. The sealing means can be formed in this case completely by a rigid body or by an elastic material. In addition, sections of the sealing means can be formed by a rigid body and other sections by the elastic material.

If the sealing means is a rigid body, enough installation space to accommodate the rigid body must be provided on a vehicle when integrating the diffuser into the vehicle. If, by contrast, it is an elastic material, the latter can be folded up, rolled up or the like so that less installation space needs to be provided on the vehicle or diffuser carrier to accommodate the sealing means.

In the diffuser according to the invention, it is furthermore provided that at least one section of the sealing means is transparent and at least one lighting device is arranged behind the transparent section as viewed from outside the space sealed by the sealing means;

at least one lighting device is embedded in the sealing means; and/or at least one lighting device forms the sealing means partially or completely.

There are thus various design options for integrating the lighting devices in the sealing means. This means that the diffuser can have a versatile design. If the lighting devices are arranged behind a transparent seal, the lighting devices are able to be protected from environmental influences such as moisture, wetness, dirt or damage caused by stone chips, for example. By contrast, lighting devices embedded in the sealing means may be easier to see. Corresponding light is thus cast directly into the surroundings. The lighting device or lighting devices can also form the sealing means itself. In this case, further sealing materials such as metal sheets, rubber bellows, silicone membranes or the like can be dispensed with.

An advantageous refinement of the diffuser provides that at least one lighting device is arranged on a lateral edge of the main body of the flap that is covered by the diffuser carrier in the retracted position of the air-guiding element and/or at least one lighting device is arranged on a base side of the flap that faces the opening of the diffuser carrier. This allows the respective lighting devices to be positioned such that a main direction of emission of light is directed optimally in relation to the surroundings. "Optimally" in this context means that when the diffuser is mounted on a vehicle, corresponding light emitted by the lighting device is easily perceived by persons in the vicinity of the vehicle.

When lighting devices are integrated in the main body of the flap itself, the available installation space can be used particularly efficiently. For example, the respective lighting devices are not in the way when the flap is retracted, meaning that no recesses need to be made in the vehicle underbody to accommodate the lighting devices. However, since the main body of the flap is comparatively thin, the lighting devices have limited design possibilities. It is therefore advantageous to attach at least one lighting device to a base side of the flap. This makes more installation space available, which allows more complex lighting devices to be provided. However, requirements in terms of the construction of the diffuser and the vehicle are increased accordingly.

Therefore, a corresponding lighting device can be rigidly or else moveably attached to the base side. A rigid attachment has a particularly simple construction. A moveable attachment has the advantage that the lighting device can be cleverly stowed away, for example by folding it in or retracting it. In addition, when the air-guiding element is extended, the lighting device can also be moved in order to targetedly direct the emitted light towards the surroundings. A moveable attachment is possible by means of hinges, for example. Activation can be effected, for example, by spring loading or an (active) actuator.

In accordance with a further advantageous configuration of the diffuser, a lighting device arranged on the base side of the flap is connected to the flap in such a way that a main direction of emission of light from the lighting device in the extended position of the air-guiding element is substantially parallel to the panel plane in which the main body of the flap extends. If the main direction of emission of the light is parallel to the panel plane, light can be cast into the surroundings of the vehicle particularly effectively when an appropriate diffuser is connected to a vehicle. To save installation space, a two-dimensional display can lie flat against the base side of the flap, for example. If the air-guiding element is then pivoted into the extended position, this display can then be pivoted in the corresponding opposite direction relative to the main body of the flap. Thus, the display protrudes from the base side of the flap, for example at a 90° angle with respect to the flap.

Preferably, a corresponding lighting device is "placed" in such a way that the main direction of emission of the light is substantially parallel to the diffuser carrier and therefore parallel to the vehicle underbody or the ground surface on which the vehicle is parked or driving. "Parallel to the panel plane" therefore refers to the position of the main body of the flap in both the extended position and in the retracted position of the air-guiding element.

In all-terrain vehicles, as a rule the area behind the rear wheel rises in relation to the driving surface. A light "parallel to the carrier" would therefore shine upwards towards the rear. An active diffuser that folds downwards accordingly reduces the angle of the vehicle bottom in comparison to the driving surface. Both carrier and flap are not necessarily parallel to the driving surface. In these types of vehicle, a downwardly folding diffuser therefore helps to achieve improved ground illumination.

Preferably, the sealing means are designed as bellows. This involves a particularly clever design that is easy to realize in terms of construction and is also cost-effective.

A vehicle according to the invention comprises an above-described diffuser. At least one such diffuser is mounted on the underbody of the vehicle and oriented towards the ground surface driven on by the vehicle. The diffuser can be retracted and extended depending on the speed of travel of the vehicle. Depending on the speed of forward travel, the corresponding air-guiding element is increasingly pivoted or folded out in order to targetedly adapt the flow conditions to the speed of travel. Preferably, the at least one diffuser is arranged on the underbody level with the rear axle or therebehind, further towards the rear, as viewed in the direction of the vehicle longitudinal axis. By way of example, the diffuser can be mounted on the vehicle underbody level with the rear bumper. In this area, the influence on the flow around the vehicle underbody by the diffuser has a particularly advantageous effect on the aerodynamic drag. In addition, the light emitted by the lighting apparatus can then be seen particularly clearly.

In accordance with a further advantageous configuration of the vehicle according to the invention, the latter comprises at least one control unit for controlling the actuating means and the lighting apparatus, wherein the control unit is designed to pivot the air-guiding element from the retracted position into the extended position by means of the actuating means and to activate the lighting apparatus when:

- a reversing mode is activated;
- a manual operating input is effected;
- the trunk is opened;
- a trailer is hitched to a trailer coupling and/or a trailer plug is plugged into a trailer socket;
- a defined speed of travel is reached;
- a defined steering angle is set;
- a direction indicator is activated;
- a braking device is activated;
- the vehicle doors are opened or closed;
- the vehicle doors are locked or unlocked; and/or
- the ignition is activated or an onboard electronics system is woken up from a sleep mode.

The control unit is a computing unit, for example a central onboard computer or a control device of a vehicle subsystem. A single control unit can control both the actuating means and the lighting apparatus. However, an individual control unit can also be provided in each case to control the actuating means and the lighting apparatus.

To recognize the corresponding boundary conditions for when the actuating means and the lighting apparatus need to be controlled, the control unit or the control units can use a data bus to access information from further control devices of the vehicle. For instance, the control unit can read a boot lid sensor, read the driving mode of the vehicle, read a speedometer, receive operating inputs via a man-machine interface such as buttons, keys, controllers, a touch-sensitive display device and the like.

By switching on the lighting apparatus in the reversing mode, the lighting apparatus can be used as an additional reversing light. Thus, the area in the surroundings that lies behind the rear of the vehicle can be lit up even more extensively, which makes it easier for the person driving the vehicle to perceive the surroundings. In this case, in particular the lighting apparatus emits cold-white light with a high light intensity, i.e., brightness.

By way of the manual operating input, the driver can also activate the lighting apparatus manually. For example, the lighting apparatus can function as a hazard warning light or also cast special light patterns into the surroundings, for example a light pattern specified by the user. The user can define the light pattern, for example via an input mask of a man-machine interface, for example via said touch-sensitive display device. This results in an eye-catching effect or "wow effect". By way of example, writing can be displayed on the lighting apparatus, a particular graphic, pictogram, animation or the like.

By manually activating the lighting apparatus, it can also be used as a work light to make it easier for the person driving the vehicle to perform tasks in the dark in the rear region of the vehicle or behind the vehicle, such as hitch a trailer or find an object that has been dropped.

The lighting apparatus can also be automatically activated when a trailer is attached to the trailer coupling or a power connection cable is clipped into a corresponding socket on the vehicle. For instance, there may be corresponding sensors on the trailer coupling which detect when a trailer is attached. This increases the convenience for the vehicle user since they no longer need to activate the lighting apparatus manually.

The lighting apparatus can also be activated automatically when the trunk is opened.

In particular, the air-guiding element is extended into different positions depending on the speed of travel of the vehicle. The extent to which it is extended depends on the magnitude of the speed of travel. The air-guiding properties can thus be targetedly adapted to the forward travel speed and thus flow velocity of the air under the vehicle underbody. A speed-dependent light pattern can additionally be created in the process. This can increase the recognition value of the vehicle.

The lighting apparatus can also be operated as a function of a steering angle. Therefore, the lighting apparatus can function as a cornering light or turning light. Accordingly, light can be cast in respective directions in which the vehicle is being steered.

Depending on a measured steering angle, the lighting apparatus can also be used automatically as a direction indicator or flashing indicator. For example, an orange flashing light, optionally supplemented by a corresponding flow animation, can be output in the turning direction when the control unit detects a respective steering wheel angle. The flashing frequency and/or speed of the flow animation can be configured as a function of the steering angle. For instance, a slow flashing frequency or flow speed could be selected for a large turning radius and a high flashing frequency or flow speed for a small turning radius, i.e., a tight bend. In addition or as an alternative to automatic activation, the lighting apparatus can also be operated as a flashing indicator when manual activation of the direction indicator is detected.

The lighting apparatus can also function as an additional brake light, for example when the driver presses a brake pedal or activates a hand brake.

The lighting apparatus can also be automatically activated when at least one vehicle door is opened or closed or the vehicle doors are locked or unlocked. As a result, a so-called "coming home" function can be provided. When opening and closing the vehicle doors, a vehicle occupant might drop something. In this case, the vehicle occupant searches for the dropped object in the immediate vicinity of the vehicle in the door area. Automatically activating the lighting apparatus in this case may make it easier to find the dropped object. In addition, for example, puddles can be better illuminated, which can prevent a vehicle occupant from accidentally stepping in the puddle when leaving the vehicle.

By automatically activating the lighting apparatus when activating the ignition or waking up the onboard electronics system of the vehicle, an eye-catching effect or enhanced user identification with the vehicle or the vehicle make can be achieved. For example, the vehicle manufacturer's logo can be cast into the surroundings by means of the lighting apparatus.

A further advantageous configuration of the vehicle according to the invention furthermore provides that a minimum height that describes a vertical minimum distance between a ground surface and a respective lighting device is stored in the control unit, wherein the control unit is designed to pivot the air-guiding element into the extended position only to the extent that the minimum distance is maintained. Due to the dimensions-known to the control unit—of the vehicle, the diffuser and the mounting position of the lighting device or lighting devices on the air-guiding element or the flap, the control unit can calculate the angle up to which the air-guiding element can be pivoted to ensure that the minimum distance is maintained. For instance, different countries may prescribe that lighting apparatuses on vehicles must be mounted above a certain minimum height. Because the control unit takes this minimum height or minimum distance into consideration, these legal framework conditions can also easily and reliably be complied with in different countries. The minimum height in Germany is 250 mm, for example. This height is easy to maintain, in particular when the vehicle is designed as an SUV.

BRIEF DESCRIPTION OF THE DRAWING FIGURES

Figure 4:
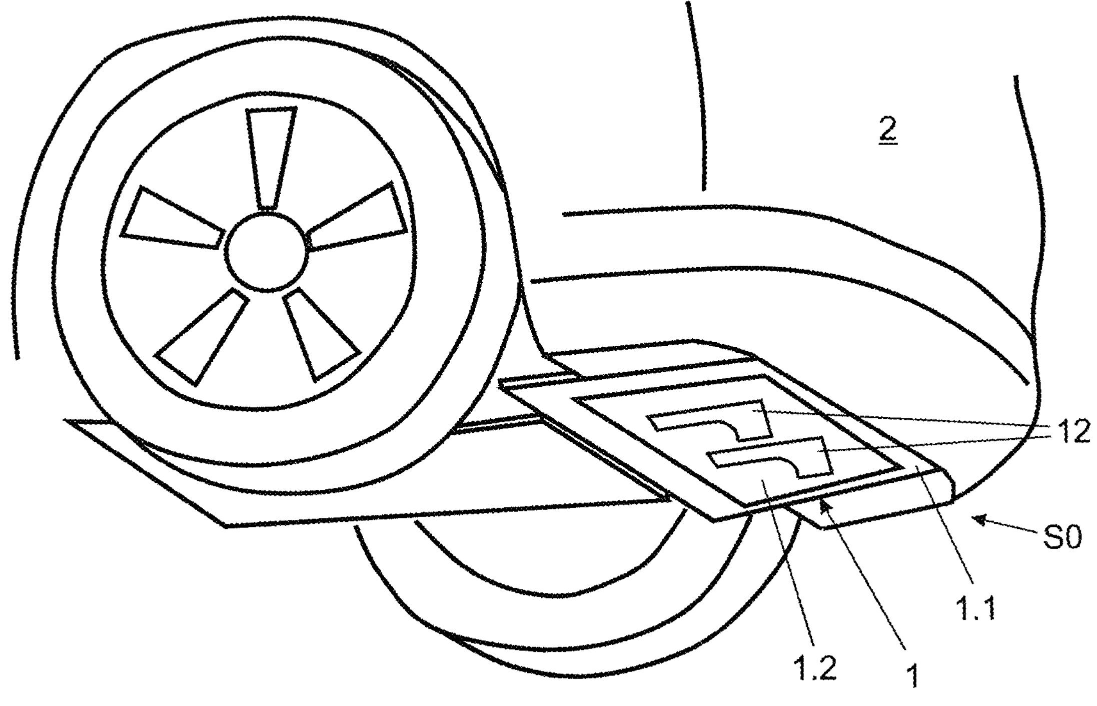

Further advantageous configurations of the diffuser and vehicle according to the invention also become apparent from the exemplary embodiments that will be described in more detail hereinafter with reference to the figures, which show:

FIG. 1 a schematic illustration of the underbody of a vehicle according to the invention comprising a diffuser according to the invention, wherein the diffuser is in an extended position;

FIG. 2 a schematic detailed illustration of the diffuser in a design with sealing means;

FIGS. 3*a* and 3*b* schematic views through a section of the vehicle according to the invention in the region of the underbody; and FIG. 4 a schematic illustration of the underbody of the vehicle according to the invention with a retracted diffuser.

DETAILED DESCRIPTION

FIG. 1 shows the view of the underbody of a vehicle 2 according to the invention. The vehicle 2 comprises a diffuser 1 according to the invention mounted on the underbody and in the rear region. Particularly preferably, the diffuser 1 is arranged between bumper and rear axle.

The diffuser 1 comprises a diffuser carrier 1.1 fixedly connected to the underbody of the vehicle 2. The diffuser 1 also comprises an air-guiding element 1.2 which, according to the invention, is designed as a flap that is pivotable relative to the diffuser carrier 1.1 about a pivot axis A. To this end, the air-guiding element 1.2 or the flap is pivotably suspended on the diffuser carrier 1.1 at an end edge 3. An actuating means (not shown in more detail) that is connected to the diffuser carrier 1.1 and air-guiding element 1.2. is provided for actuation purposes.

FIG. 1 shows the air-guiding element 1.2 in an extended position S1. By means of the actuating means, the air-guiding element 1.2 can also be transferred into a retracted position S0 shown in FIG. 4. In the retracted position S0, the air-guiding element 1.2 is embedded in an opening 4 in the diffuser carrier 1.1. As shown in FIG. 4, the air-guiding element 1.2 preferably closes flush with the diffuser carrier 1.1.

According to the invention, the diffuser 1 also comprises a lighting apparatus 5. The lighting apparatus 5 in turn comprises at least one lighting device 5.1. This can be any device used for emitting light. Particularly preferably, light can be emitted in different wavelength ranges, i.e., colors, and in different brightness levels. Particularly preferably, both rigid light patterns and dynamic or animated light patterns can be created.

A lighting device 5.1 can be embedded, for example, in a lateral edge 6 of the main body of the flap. At least one lighting device 5.1 can also be arranged on a base side 7 of the flap facing the opening 4 of the diffuser carrier 1.1. The lighting device 5.1 is preferably arranged in such a way that the main direction of emission R of the respective lighting device 5.1 is substantially parallel to a panel plane E in which the flap extends. This has the result that the light emitted by the lighting device 5.1 or the lighting apparatus 5 is cast into the surroundings of the vehicle 2 particularly clearly.

The main direction of emission R can also be directed parallel to the vehicle longitudinal axis. Different lighting devices 5.1 may also have different orientations.

As FIG. 1 shows, when pivoting the air-guiding element 1.2 from the retracted position S0 into the extended position S1, a gap 9 is created between air-guiding element 1.2 and diffuser carrier 1.1 or the opening 4. The diffuser 1 serves, inter alia, to reduce the aerodynamic drag of the vehicle 2 during travel. Inflowing air can flow around the flap and thus get into the gap 9. This is associated with turbulence and leads to a drop in pressure and thus rise in the aerodynamic drag.

FIG. 2 shows a configuration of the diffuser 1 according to the invention in which sealing means 8 are provided on the air-guiding element 1.2 in order to close this gap 9. As FIG. 2 shows, at least one lighting device 5.1 is embedded in the sealing means 8 and/or is arranged behind the sealing means 8 as viewed from the outside, wherein in this case, the subsegment of the sealing means 8 situated in front of the lighting device 5.1 is transparent. At least one lighting device 5.1 can also form at least one section of a sealing means 8.

FIGS. 3*a*) and 3*b*) show two possible configurations of the sealing means 8. The sealing means 8 in FIG. 3*a*) are formed by a rigid body 10. By contrast, the sealing means 8 in FIG. 3*b*) are formed by an elastic material 11. As is apparent from FIG. 3*a*), when the sealing means 8 is formed by a rigid body 10, it is accordingly necessary to provide installation space on the vehicle 2 to accommodate the rigid body 10. By contrast, if the sealing means 8 is made of an elastic material 11, the latter can be rolled up, folded up or the like when the air-guiding element 1.2 is moved into the retracted position S0. This is particularly space-efficient.

The sealing means 8 can also be used to protect the lighting apparatus 5 or the lighting devices 5.1 from soiling, damage and weather influences.

FIG. 4 once again shows the underbody of the vehicle 2 with a retracted air-guiding element 1.2. In the exemplary embodiment, the air-guiding element 1.2 is designed as a flat flap or panel. In general, however, the flap could also deviate from a substantially flat shape and be undulated or curved, for example. Particularly preferably, guide bodies 12 can be provided that extend away from the main body of the air-guiding element 1.2 and serve to targetedly guide the air flow when the vehicle 2 is moving. The guide bodies 12 can be designed as fins, for example.

Because it has the diffuser 1 according to the invention, not only can the vehicle 2 according to the invention be operated more efficiently at high speeds of travel but it can also be seen particularly clearly in poor visibility conditions, such as in fog or in the dark. The light cast into the surroundings by the lighting apparatus 5 therefore increases visibility. In addition, user convenience can be improved, since the ability of the driver or a vehicle occupant to perceive the vehicle surroundings can be improved depending on the situation, for example if vehicle doors are open to make it easier to find an object that has been dropped. In addition, road safety can be improved because other road users are better able to notice the vehicle 2 and the driver is better able to perceive their surroundings and thus better recognize obstacles.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle diffuser comprising:

a diffuser carrier;

at least one air-guiding element moveable relative to the diffuser carrier, wherein the air-guiding element is a flap pivotably connected to the diffuser carrier at an end edge of the diffuser carrier;

an actuator connected to the diffuser carrier and the air-guiding element and configured to change a position of the air-guiding element, wherein the actuator is configured to pivot the air-guiding element from a retracted position, in which the flap is embedded in an opening in the diffuser carrier corresponding to a cross-section of the flap, into at least one extended position by actuation;

a lighting apparatus, comprising at least one lighting device, attached to the air-guiding element, wherein the at least one lighting device is configured to emit light when the air-guiding element is or has been pivoted from the retracted position into the at least one extended position; and sealing means connected at least to the flap, wherein, in the at least one extended position, the sealing means fill a gap formed when the flap is pivoted relative to the diffuser carrier, and wherein at least parts of the sealing means are formed by a rigid body or by an elastic material, wherein at least one section of the sealing means is transparent and at least one lighting device is arranged behind the transparent section of the sealing means as viewed from outside a space sealed by the sealing means; and wherein the at least one lighting device is embedded in the sealing means of the vehicle diffuser or the at least one lighting device partially or completely forms the sealing means of the vehicle diffuser.

2. The vehicle diffuser of claim 1, wherein the at least one lighting device is arranged on a lateral edge of the flap that is covered by the diffuser carrier in the retracted position of the air-guiding element, or the at least one lighting device is arranged on a base side of the flap facing the opening of the diffuser carrier.

3. The vehicle diffuser of claim 2, wherein the lighting device arranged on the base side of the flap is connected to the flap in such a way that a main direction of emission of light from the lighting device in the extended position of the air-guiding element is parallel to a panel plane in which the flap extends.

4. The vehicle diffuser of claim 1, wherein the sealing means are bellows.

5. A vehicle comprising:

at least one vehicle diffuser mounted on an underbody of the vehicle and oriented towards a ground surface below the vehicle, wherein the at least one diffuser comprises a diffuser carrier;

at least one air-guiding element moveable relative to the diffuser carrier, wherein the air-guiding element is a flap pivotably connected to the diffuser carrier at an end edge of the diffuser carrier;

an actuator connected to the diffuser carrier and the air-guiding element and configured to change a position of the air-guiding element, wherein the actuator is configured to pivot the air-guiding element from a retracted position, in which the flap is embedded in an opening in the diffuser carrier corresponding to a cross-section of the flap, into at least one extended position by actuation;

a lighting apparatus, comprising at least one lighting device, attached to the air-guiding element, wherein the at least one lighting device is configured to emit light when the air-guiding element is or has been pivoted from the retracted position into the at least one extended position; and sealing means connected at least to the flap, wherein, in the at least one extended position, the sealing means fill a gap formed when the flap is pivoted relative to the diffuser carrier, and wherein at least parts of the sealing means are formed by a rigid body or by an elastic material, wherein at least one section of the sealing means is transparent and at least one lighting device is arranged behind the transparent section of the sealing means as viewed from outside a space sealed by the sealing means; and wherein the at least one lighting device is embedded in the sealing means of the vehicle diffuser or the at least one lighting device partially or completely forms the sealing means of the vehicle diffuser.

6. The vehicle of claim 5, wherein the at least one diffuser is arranged on the underbody level with a rear axle or behind the rear axle, further towards a rear of the vehicle as viewed in a direction of a vehicle longitudinal axis.

7. The vehicle of claim 5, further comprising:

a control unit configured to control the actuator and the lighting apparatus, wherein the control unit is configured to pivot the air-guiding element from the retracted position into the at least one extended position using the actuator and to activate the lighting apparatus when a reversing mode is activated;

a manual operating input is effected;

a trunk of the vehicle is opened;

a trailer is hitched to a trailer coupling of the vehicle or a trailer plug is plugged into a trailer socket of the vehicle;

a defined speed of travel of the vehicle is reached;

a defined steering angle of the vehicle is set;

a direction indicator of the vehicle is activated;

a braking device of the vehicle is activated;

doors of the vehicle are opened or closed;

the doors of the vehicle are locked or unlocked; or an ignition of the vehicle is activated or an onboard electronics system of the vehicle is woken up from a sleep mode.

8. The vehicle of claim 7, wherein a minimum height corresponding to a vertical minimum distance between a ground surface and the at least one lighting device is stored in the control unit, wherein the control unit is configured to pivot the air-guiding element into the at least one extended position only to an extent that the minimum distance is maintained.

* * * * *